US012687441B2

(12) United States Patent
Kim et al.

(10) Patent No.: US 12,687,441 B2
(45) Date of Patent: Jul. 21, 2026

(54) FORCE AND TORQUE SENSOR WITH OVERLOAD STRUCTURE AND METHOD FOR MANUFACTURING

(71) Applicant: FORCEN INC., Toronto (CA)

(72) Inventors: Samuel Kim, Toronto (CA); Roberto Sanchez Enkerlin, Toronto (CA); I-Hsiang Chen, Toronto (CA); Robert Joseph Brooks, Mississauga (CA)

(73) Assignee: FORCEN INC., Toronto (CA)

( * ) Notice: Subject to any disclaimer, the term of this patent is extended or adjusted under 35 U.S.C. 154(b) by 299 days.

(21) Appl. No.: 18/550,887

(22) PCT Filed: Mar. 11, 2022

(86) PCT No.: PCT/CA2022/050361
§ 371 (c)(1),
(2) Date: Sep. 15, 2023

(87) PCT Pub. No.: WO2022/192993
PCT Pub. Date: Sep. 22, 2022

(65) Prior Publication Data
US 2024/0192065 A1 Jun. 13, 2024

Related U.S. Application Data

(60) Provisional application No. 63/162,343, filed on Mar. 17, 2021.

(51) Int. Cl.
*G01L 1/22* (2006.01)
*B23H 9/00* (2006.01)
*G01L 5/00* (2006.01)

(52) U.S. Cl.
CPC .............. *G01L 1/2287* (2013.01); *B23H 9/00* (2013.01); *G01L 5/0076* (2013.01)

(58) Field of Classification Search
CPC ... G01L 1/2287; G01L 5/0076; G01L 3/1457; G01L 1/2231; G01L 5/1627; G01L 1/26; G01L 5/009; B23H 9/00
See application file for complete search history.

(56) References Cited

U.S. PATENT DOCUMENTS 6,694,828 B1    2/2004 Nicot
11,287,340 B2 *  3/2022 Jiang ......................... G01L 1/12
(Continued)

FOREIGN PATENT DOCUMENTS

AU    2014249548 A1 *  7/2015 ............. G01L 5/166
CN       108700513 A    10/2018
(Continued)

OTHER PUBLICATIONS

Extended European Search Report dated Sep. 10, 2024 in European Patent Application No. 22770114.1 (17 pages).
(Continued)

*Primary Examiner* — Octavia Hollington
(74) *Attorney, Agent, or Firm* — SMART & BIGGAR LP; Isis E. Caulder; Ryan De Vries

(57) ABSTRACT
A force/torque sensor includes an outer body structure, an inner body structure, and three sensor structures extending between the outer body structure and the inner body structure. Overload structures are positioned between the sensor structures. An overload structure includes an outer portion that has a plurality of outer facets, and an inner portion that has a plurality of corresponding opposing inner facets. The outer facets and the inner facets are configured to permit a limited predetermined amount of relative motion between the inner body structure and the outer body structure in at least six degrees of freedom from a neutral position, and to inhibit relative motion between the inner body structure and the outer body structure beyond the predetermined amount. An overload structure may be formed by separating a bridge
(Continued)

using wire-cut electrical discharge machining, optionally performed in a single pass.

20 Claims, 9 Drawing Sheets

(56)                References Cited

U.S. PATENT DOCUMENTS

| | | | | |
|---|---|---|---|---|
| 11,662,261 | B2 * | 5/2023 | Yamaguchi | G01L 5/226 |
| | | | | 73/862.627 |
| 11,835,403 | B2 * | 12/2023 | Suganumata | G01L 5/226 |
| 2010/0274447 | A1 | 10/2010 | Stumpf | |
| 2011/0314935 | A1 | 12/2011 | Krippner et al. | |
| 2013/0192356 | A1 | 8/2013 | De Graff et al. | |
| 2018/0132761 | A1 | 5/2018 | Chan et al. | |
| 2019/0105842 | A1 | 4/2019 | Dau et al. | |
| 2019/0390985 | A1 | 12/2019 | Kwok et al. | |
| 2020/0003645 | A1 | 1/2020 | Jiang | |
| 2020/0056950 | A1 | 2/2020 | Strauss | |
| 2020/0284667 | A1 | 9/2020 | Glusiec | |

FOREIGN PATENT DOCUMENTS

| | | | | | |
|---|---|---|---|---|---|
| CN | 114623959 | A | | 6/2022 | |
| CN | 119413343 | A | * | 2/2025 | ........... G01L 5/1627 |
| CN | 119984615 | A | * | 5/2025 | |
| JP | 2005300465 | A | * | 10/2005 | |
| JP | 2020125991 | A | | 8/2020 | |
| TW | 200735163 | A | | 9/2007 | |

OTHER PUBLICATIONS

International Preliminary Report on Patentability dated Sep. 28, 2023.

* cited by examiner

FORCE AND TORQUE SENSOR WITH OVERLOAD STRUCTURE AND METHOD FOR MANUFACTURING

FIELD

This disclosure relates generally to overload structures, and more specifically to overload structures for use with multiple degree-of-freedom force/torque sensors.

INTRODUCTION

In some applications, silicon-based strain gauges (also known as ceramic strain gauges) may be used to detect force and/or torque. Typically, silicon-based sensors are relatively small, and require precision placement, often by hand. Ceramic strain gauges are typically highly sensitive, and as a result, they may be used to measure deflection in larger and/or thicker load beams or other load structures. Accordingly, in some applications a separate, designated overload structures may not be considered necessary. For example, the load beam (or other structure) on which a ceramic strain gauge is placed may be considered robust enough to avoid experiencing permanent deformation or other damage in response to forces and/or torque that may be expected during use.

While ceramic strain gauges are often characterized as being highly sensitive, they are typically more temperature sensitive, and may be more prone to drift during short-term or long-term operation. As a result, there may be significant hysteresis and/or other variations in their yield measurements.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

To measure force and/or torque, a sensing device may include one or more strain gauges secured to elongated beams (or other load structures) to measure deflection of the beams as a result of a net force/torque applied to the sensing device. For example, a force/torque sensor may be coupled between a robotic arm and an end effector to measure force and/or torque at the end effector.

In sensor devices that use strain gauges with relatively high sensitivity (e.g. silicon-based strain gauges), relatively small deflections in the elongated beams may be detected. As a result, relatively thick load beams may be used in an effort to improve the durability and/or maximum load rating of the sensor device. However, silicon-based strain gauges may tend to exhibit a relatively high temperature sensitivity and/or yield hysteresis, which may result in excessive sensor 'drift' over time. Additionally, in robotic applications that operate at high velocities, accelerations, and/or loads, the relatively thick load beams may not be sufficiently rigid to prevent strain hardening and/or damage to applied silicon-based strain gauges.

As disclosed herein, a force/torque sensor may include one or more overload structures to prevent (or at least inhibit) excess deflection of elongated beams or other sensor structures to which one or more strain gauges are secured. Providing overload structures to limit deflection may facilitate the use of relatively thin beams or other sensor structures, which may in turn facilitate the use of metal-foil strain gauges.

In accordance with one broad aspect of this disclosure, there is provided a force/torque sensor comprising: an outer body structure; an inner body structure; three sensor structures, each sensor structure extending between the outer structure and the inner structure; and three overload structures, each overload structure being positioned between two of the three sensor structures; wherein each of the three overload structures includes an outer portion extending inwardly from the outer body structure, and an inner portion extending outwardly from the inner body structure, and wherein the outer portion has a plurality of outer facets, the inner portion has a plurality of corresponding opposing inner facets, and the plurality of outer facets and the plurality of inner facets are configured to permit a limited predetermined amount of relative motion between the inner body structure and the outer body structure in at least six degrees of freedom from a neutral position, and to inhibit relative motion between the inner body structure and the outer body structure beyond the predetermined amount.

In some embodiments, the three sensor structures and the three overload structures are spaced generally equidistantly from each other.

In some embodiments, when the outer body structure and the inner body structure are in the neutral position, a gap between each of the plurality of outer facets and the corresponding one of the plurality of inner facets has a distance of between about 25 microns to 0.5 mm.

In some embodiments, each of the three sensor structures has a width of between about 1 to 25 mm.

In some embodiments, each of the three sensor structures has a width of between about 2 to 12 mm.

In some embodiments, the force/torque sensor further comprises a strain sensor secured to each of the three sensor structures.

In some embodiments, the strain sensor comprises a metal-foil strain gauge.

As disclosed herein, overload structures may be formed using wire-cut electrical discharge machining. For example, an overload bridge may be separated into an inner portion and an outer portion of an overload structure using wire-cut EDM.

Using wire-cut EDM to provide the inner and outer facets of an overload structure may have one or more advantages. For example, this may promote a consistent gap distance between inner and outer portions of an overload structure. It may also promote rapid and/or cost effective manufacture of the force/torque sensor.

In accordance with another broad aspect of this disclosure, there is provided a method of manufacturing a force/torque sensor frame comprising an outer body structure, an inner body structure, at least one sensor structure extending between the outer structure and the inner structure, and at least one overload structure, the method comprising: providing a body structure comprising the outer body structure, the inner body structure, the at least one sensor structure extending between the outer structure and the inner structure, and at least one overload bridge extending between the outer structure and the inner structure; and separating, via wire-cut electrical discharge machining, the at least one overload bridge into an outer portion extending from the outer body structure and an inner portion extending from the inner body structure, the outer portion having a plurality of outer facets, and the inner portion having a plurality of corresponding opposing inner facets.

In some embodiments, the wire-cut electrical discharge machining is performed in a single pass.

In some embodiments, the plurality of outer facets are formed during a first pass of the wire-cut electrical discharge machining, and the plurality of inner facets are formed during a second pass of the wire-cut electrical discharge machining.

In some embodiments, when the outer body structure and the inner body structure are in a neutral position, a gap between each of the plurality of outer facets and the corresponding one of the plurality of inner facets has a distance of between about 25 microns to 0.5 mm.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
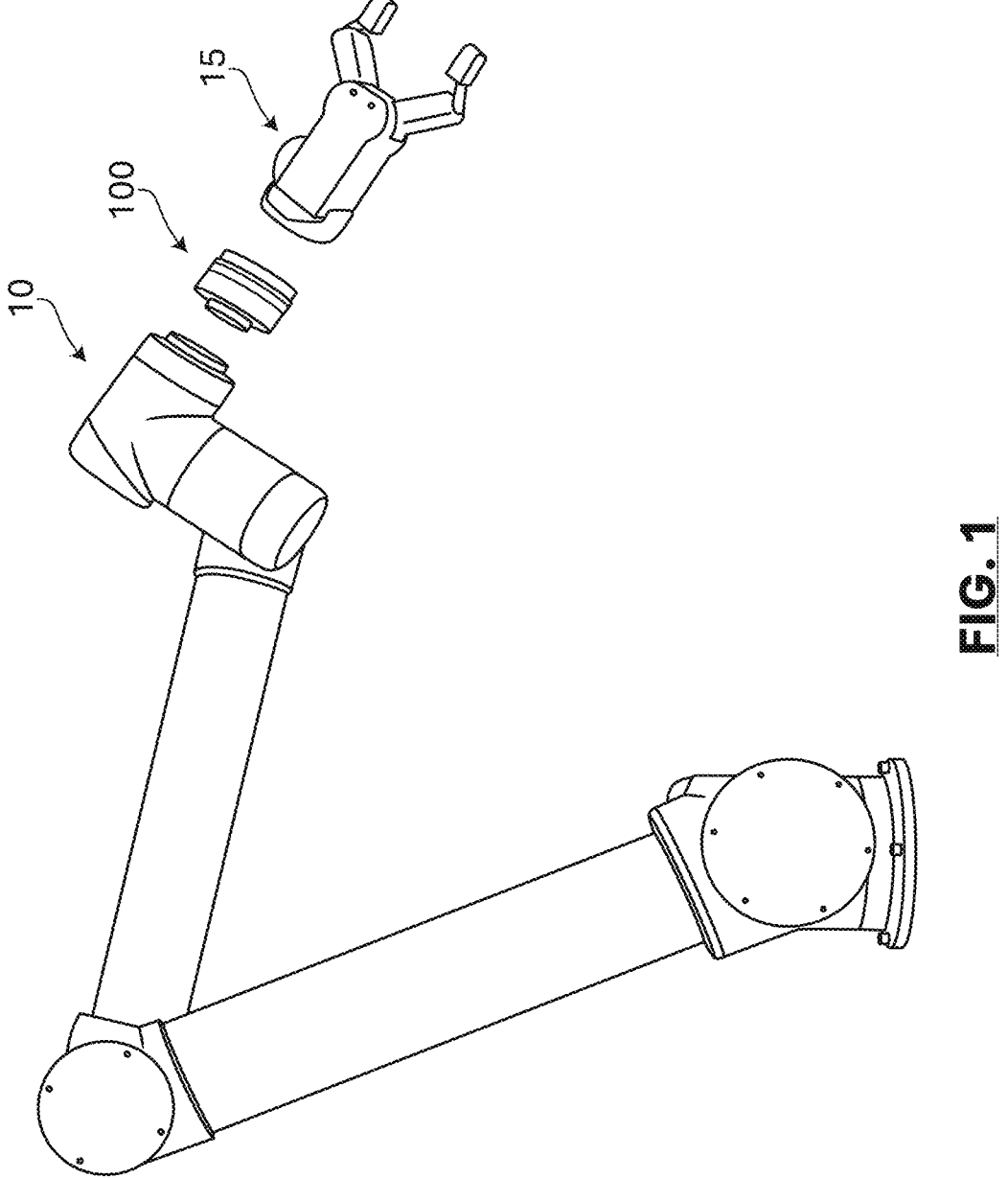
FIG. 1 is a partially-exploded perspective view of a robotic arm, end effector, and force/torque sensor.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

While the apparatus and methods disclosed herein are described specifically in relation to and in use with robotic arm and end effector, it will be appreciated that the apparatus and methods may alternatively be used to measure force and/or torque in other applications.

FIG. 1 illustrates an example of a force/torque sensor 100 positioned between a robotic arm 10 and an end effector 15. In use, the force/torque sensor may measure forces and/or torques acting on the end effector relative to the robotic arm.

FIGS. 2 to 16 illustrate an example embodiment of a force/torque sensor, referred to generally as 100. In the illustrated example, force/torque sensor 100 is configured to measure force and/or torque for a six degree-of-freedom (6DOF) application.

Figure 2:
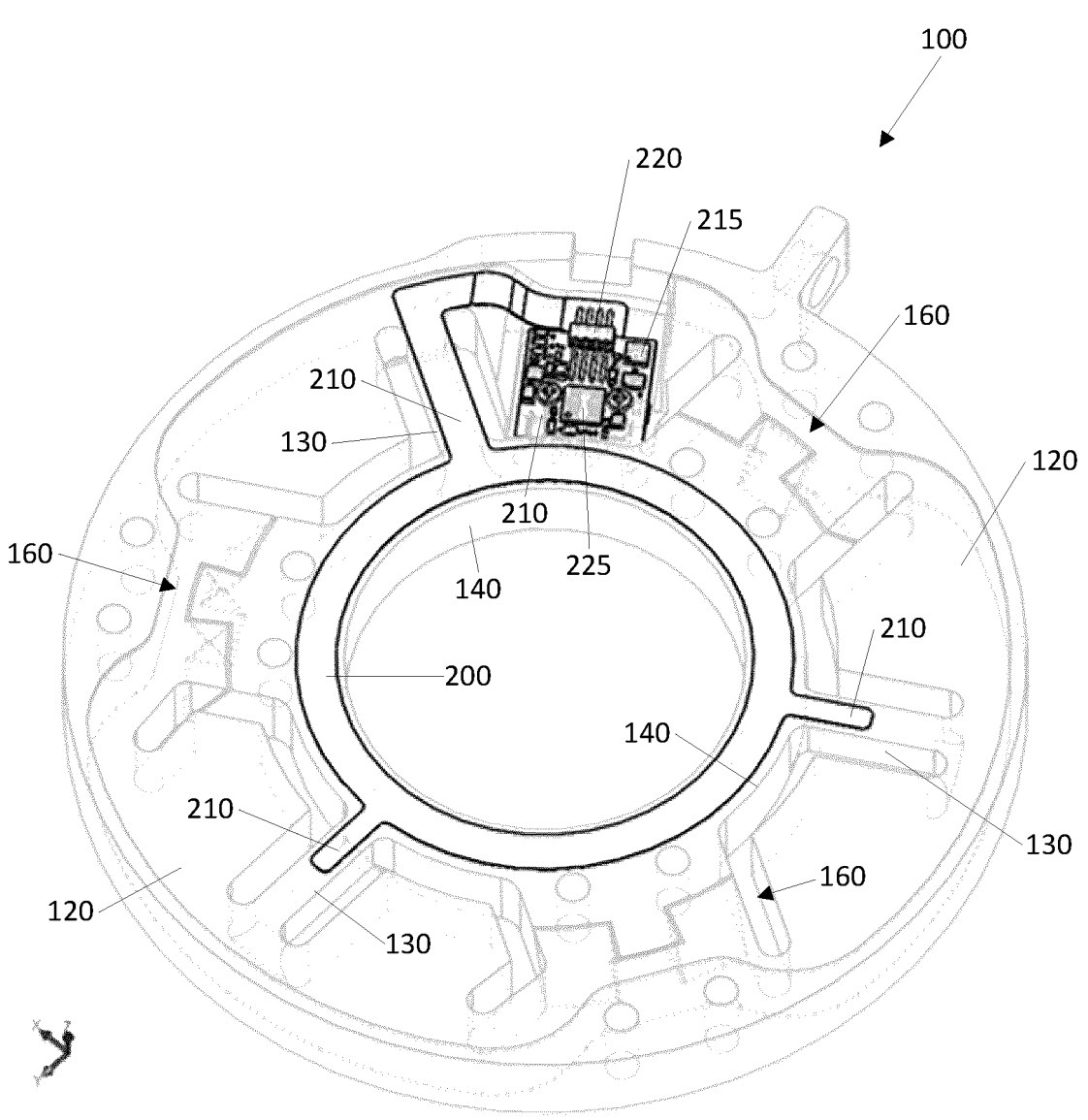
FIG. 2 is a perspective view of a force/torque sensor, in accordance with one embodiment.

As illustrated in FIG. 2, sensor 100 includes an outer body structure 120, an inner body structure 140, and three sensor structures 130, each extending between the outer body structure 120 and the inner body structure 140. With reference to FIG. 1, the outer body structure may be coupled to a robotic arm, and the inner body structure may be coupled to an end effector, or vice versa. In such a configuration, relative motion between the outer body structure 120 and the inner body structure 140 results in deflection of one or more of the sensor structures.

In the illustrated example, each sensor structure 130 is in the form of an elongate beam 130. It will be appreciated that a sensor structure with any other suitable geometry may be used in one or more alternative embodiments. The dimensions of a sensor structure may be selected based on the desired sensitivity of the sensor. For example, each beam 130 may have a width of about 1 to 25 mm, or from about 2 to 12 mm.

To measure force and/or torque, strain gauges may be secured to the sensor structures to measure their relative deflection as a result of the net force/torque on the sensor 100. In the illustrated example, metal-foil strain gauges are used to measure deflection of each of the three sensor structures 130. Alternatively, silicon-based strain gauges, or other suitable sensing elements, may be used.

In the illustrated example, strain gauges 210 are embedded in a multi-layer film 200 that has been dimensioned to fit within a surface feature of the inner body structure 140. Embedding strain gauges (and their associated wiring) in a multi-layer film may have one or more advantages. For example, it may promote consistent positioning of one or more strain gauges relative to the sensor structures. Additionally, or alternatively, it may reduce the amount and/or skill of labour required to position the strain gauges in a desired location on the sensor structures. Also illustrated in the example embodiment are a sensor circuit 210 that includes an inertial measurement unit (IMU) 215, an analog-to-digital (ADC) circuit 225, and a connector 220 for coupling circuit 210 to film 200.

Figure 3:
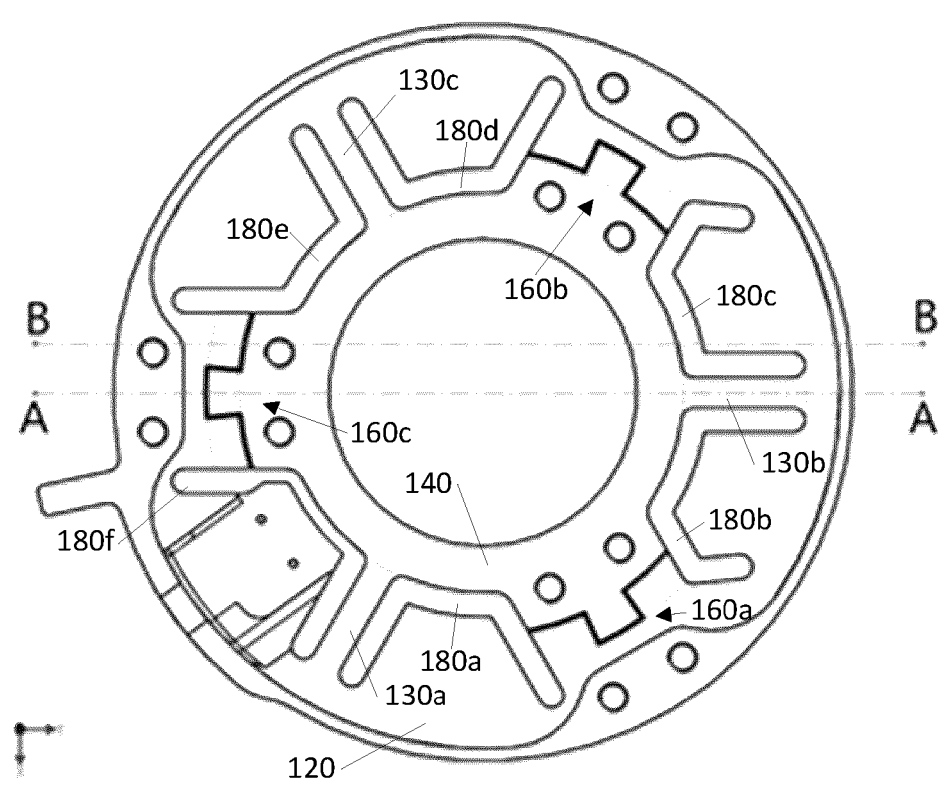
FIG. 3 is a top plan view of the force/torque sensor of FIG. 2, with sensor electronics omitted for clarity.
Figure 4:
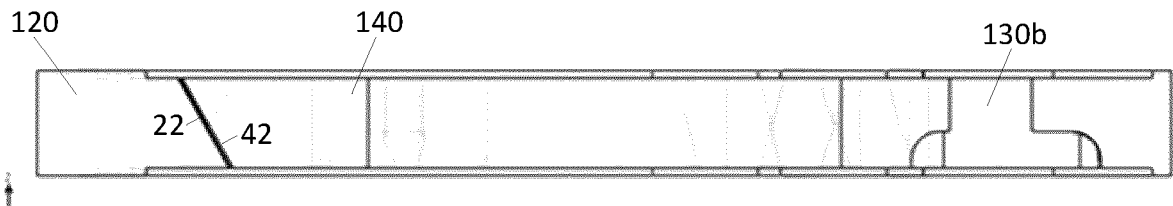
FIG. 4 is a section view of the force/torque sensor of FIG. 3, taken along the line A-A in FIG. 3.
Figure 5:
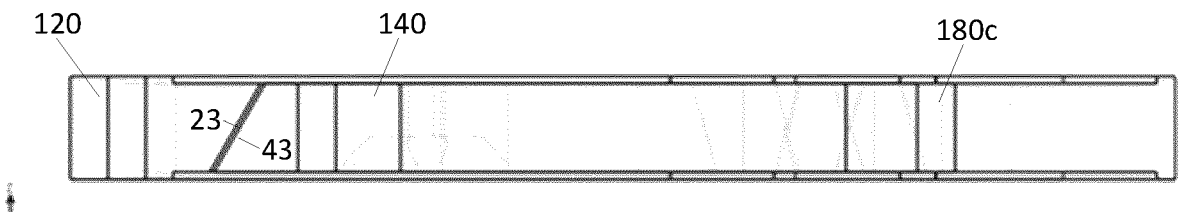
FIG. 5 is a section view of the force/torque sensor of FIG. 3, taken along the line B-B in FIG. 3.

Turning to FIG. 3, sensor 100 also includes three overload structures, each referred to generally as 160. In use, the overload structures permit a limited predetermined amount of relative motion between the inner body structure and the outer body structure. Also, the overload structures may inhibit or prevent relative motion between the inner body structure and the outer body structure beyond the predetermined amount. As a result, the overload structures act to limit the total deflection of the three sensor structures 130, e.g. when force/torque sensor 100 is subjected to relatively high forces and/or torques. By providing a 'hard stop' to limit total deflection of the three sensor structures 130, the overload structures may inhibit or prevent damage to the sensor structures 130, and/or to one or more strain gauges 210 secured thereto.

In the illustrated example, three overload structures 160 are provided, with an overload structure 160 being positioned generally equidistant between adjacent sensor structures 130. Also, a slot 180 extends between inner body structure 140 and the outer body structure 120 between an overload structure 160 and a sensor structure 130. As illustrated, sensor structure 130a is bounded by portions of slots 180a and 180f, sensor structure 130b is bounded by portions of slots 180b and 180c, and sensor structure 130c is bounded by portions of slots 180d and 180e. Also, overload structure 160a is bounded by portions of slots 180a and 180b, overload structure 160b is bounded by portions of slots 180c and 180d, and overload structure 160c is bounded by portions of slots 180e and 180f.

Figure 6:
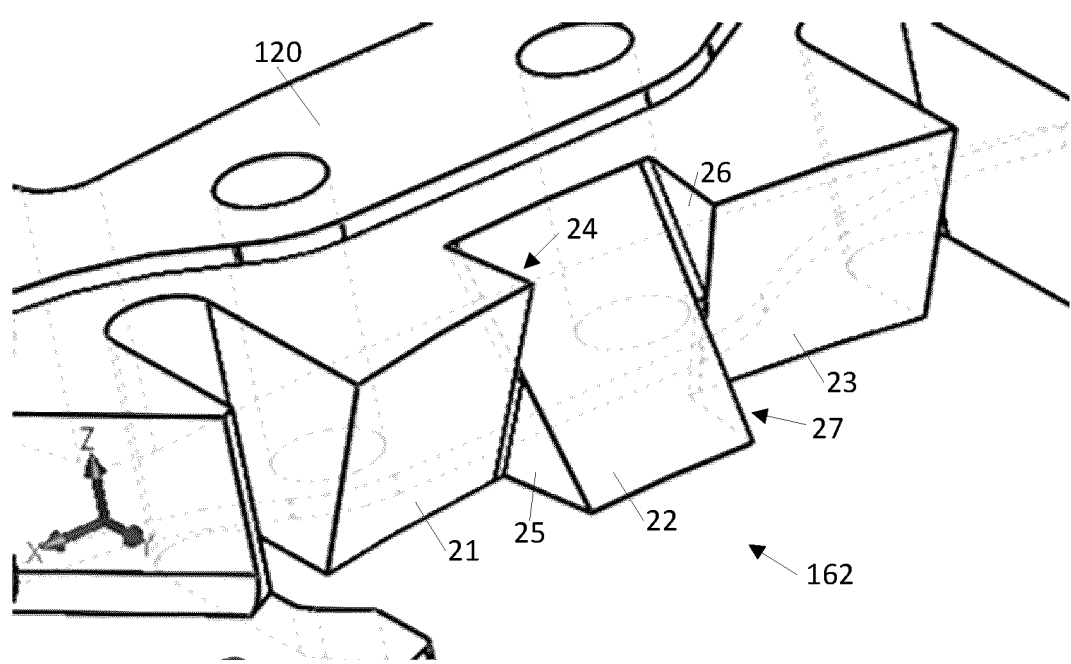
FIG. 6 is a perspective view of an outer portion of an overload structure of the force/torque sensor of FIG. 3.
Figure 7:
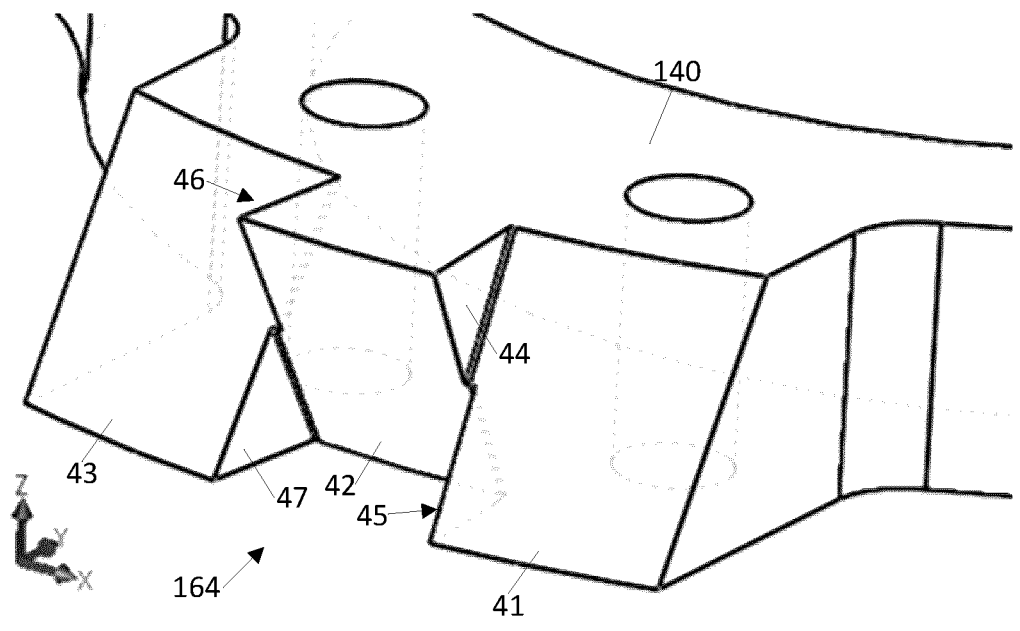
FIG. 7 is a perspective view of an inner portion of an overload structure of the force/torque sensor of FIG. 3.

Turning to FIGS. 6 and 7, overload structure 160 includes an outer portion 162 that extends from the outer body structure 120, and an inner portion 164 that extends from the inner body structure 140. Outer portion 162 has a plurality of outer facets 21-27, and inner portion 164 has a plurality inner facets 41-47. In the illustrated example, each outer and inner facet has a corresponding opposing facet.

When the inner body structure 140 and the outer body structure 120 are in a neutral or unloaded position in which the three sensor structures 130 are not subject to significant deflection (e.g. when the net forces/torque on sensor 100 are low), each of the outer facets are spaced from their corresponding opposing inner facet by a gap distance. For example, the gap distance may be between about 25 microns and 0.5 mm. Also, in a neutral position, the inner body structure 140 and the outer body structure 120 are only in contact with each other via the three sensor structures 130.

When the inner body structure 140 and the outer body structure 120 are subjected to a net external force or torque, initially the inner portion 164 and the outer portion 162 of overload structure 160 remain spaced from each other, permitting a limited amount of relative motion between the inner body structure and the outer body structure. This allows sensor structures 130 to be deflected, with the deflection being measured by one or more strain gauges mounted on the sensor structures 130, and the strain measurements used to determine the net force(s) and/or torque(s) acting on sensor 100.

If the net force(s) and/or torque(s) acting on sensor 100 are sufficient, as the inner body structure 140 and the outer body structure 120 are moved relative to each other, after an initial amount of relative motion, at least one pair of inner and outer facets of the inner portion 164 and the outer portion 162 of overload structure 160 may be brought into abutment with each other, thereby inhibiting or preventing further relative motion between the inner body structure and the outer body structure.

In the illustrated example, outer portion 162 may be characterized as having a first segment that includes facets 21 and 24, a second segment that includes facets 25, 22, and 27, and a third segment that includes facets 26 and 26. Similarly, the illustrated inner portion 164 may be characterized as having a first segment that includes facets 41 and 45, a second segment that includes facets 44, 42, and 46, and a third segment that includes facets 47 and 43. In one or more alternative embodiments, an overload structure with outer and inner portions that only include two segments may inhibit undesired relative motion between inner body structure 140 and the outer body structure 120 for six degrees-of-freedom using. For example, in the illustrated example facets 21, 25, 24, and 22 (and complementary facets 41, 45, 44, and 42) may be sufficient to provide 6DOF overload protection.

FIGS. 8 to 16 illustrate examples of an overload structure 160 inhibiting motion resulting from various forces and/or torques applied to sensor 100.

Figure 8:
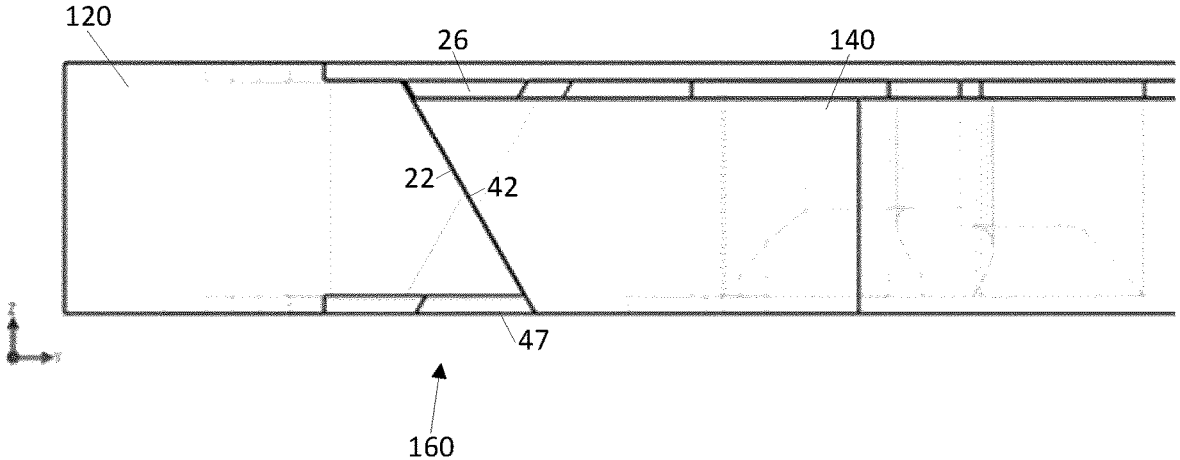
FIG. 8 is a section view of an overload structure of the force/torque sensor of FIG. 3, taken along the line A-A in FIG. 3, with the overload structure inhibiting further motion in the positive Z direction.

In the example illustrated in FIG. 8, facets 22 and 42 are in abutment with each other, preventing further relative displacement of inner body structure 140 and the outer body structure 120 in response to an external force in the positive Z direction.

Figure 9:
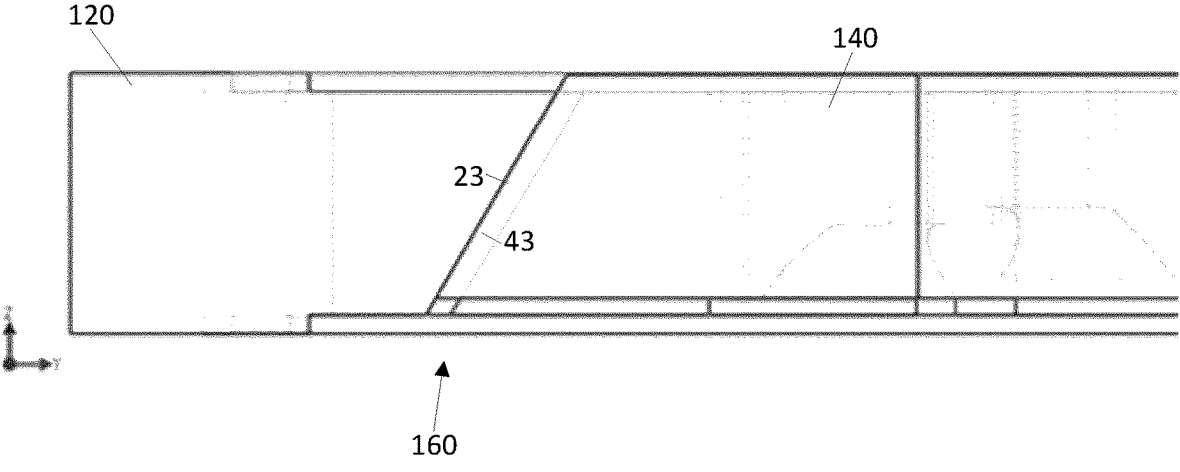
FIG. 9 is a section view of an overload structure of the force/torque sensor of FIG. 3, taken along the line B-B in FIG. 3, with the overload structure inhibiting further motion in the negative Z direction.

In the example illustrated in FIG. 9, facets 21 and 41 and/or facets 23 and 43 are in abutment with each other, preventing further relative displacement of inner body structure 140 and the outer body structure 120 in response to an external force in the negative Z direction.

Figure 10:
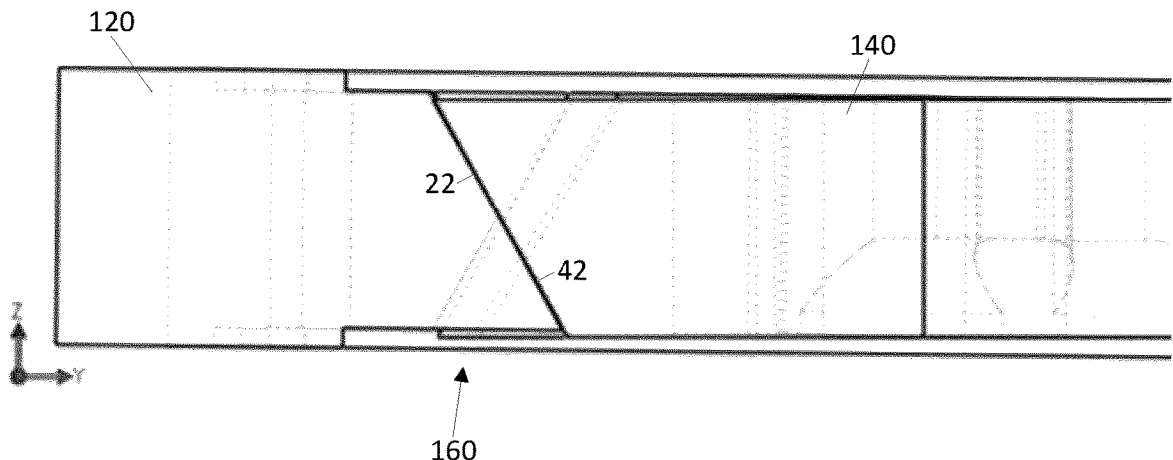
FIG. 10 is a section view of an overload structure of the force/torque sensor of FIG. 3, taken along the line A-A in FIG. 3, with the overload structure inhibiting further positive rotation about an X axis.

In the example illustrated in FIG. 10, facets 22 and 42 are in abutment with each other, preventing further relative rotation of inner body structure 140 and the outer body structure 120 in a positive direction about an X axis (i.e. in response to an external torque).

Figure 11:
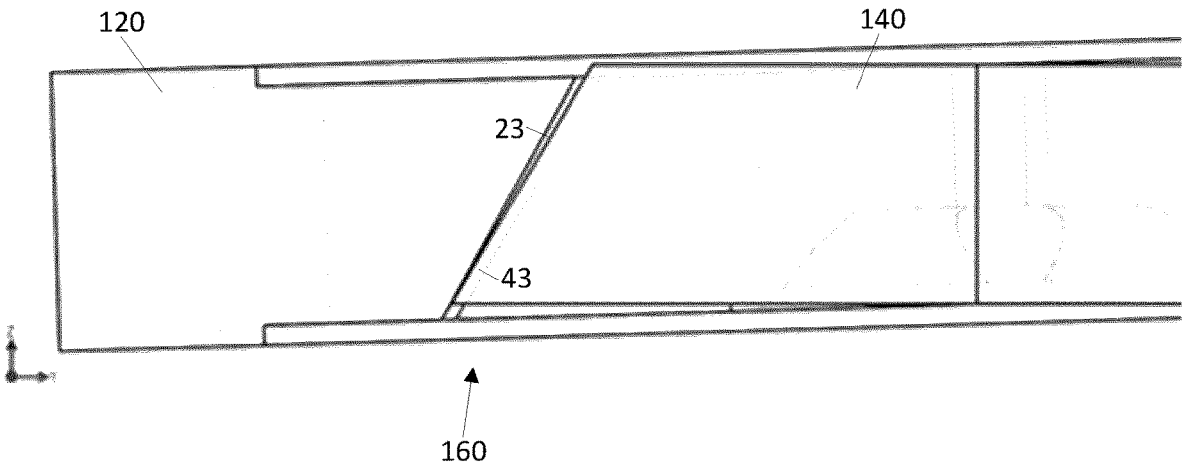
FIG. 11 is a section view of an overload structure of the force/torque sensor of FIG. 3, taken along the line B-B in FIG. 3, with the overload structure inhibiting further negative rotation about an X axis.

In the example illustrated in FIG. 11, facets 21 and 41 and/or facets 23 and 43 are in abutment with each other, preventing further relative rotation of inner body structure 140 and the outer body structure 120 in a negative direction about an X axis (i.e. in response to an external torque).

Figure 12:
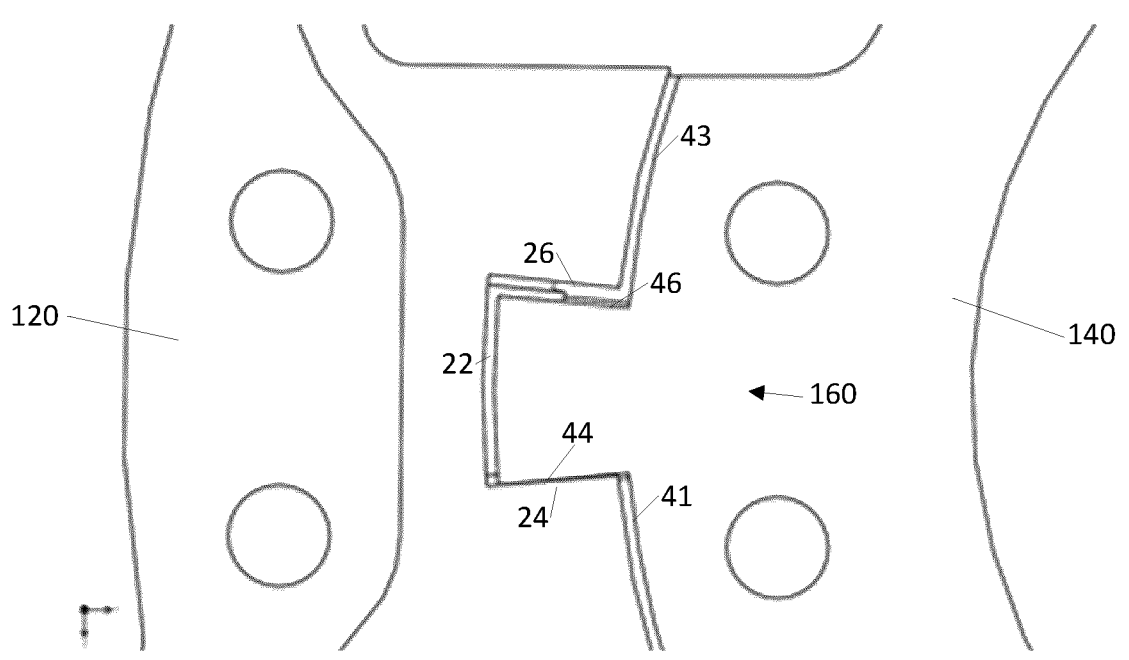
FIG. 12 is a top plan view of an overload structure of the force/torque sensor of FIG. 3, with the overload structure inhibiting further positive rotation about a Z axis.

In the example illustrated in FIG. 12, facets 24 and 44 and/or facets 27 and 47 are in abutment with each other, preventing further relative rotation of inner body structure 140 and the outer body structure 120 in a positive direction about an Z axis (i.e. in response to an external torque).

Figure 13:
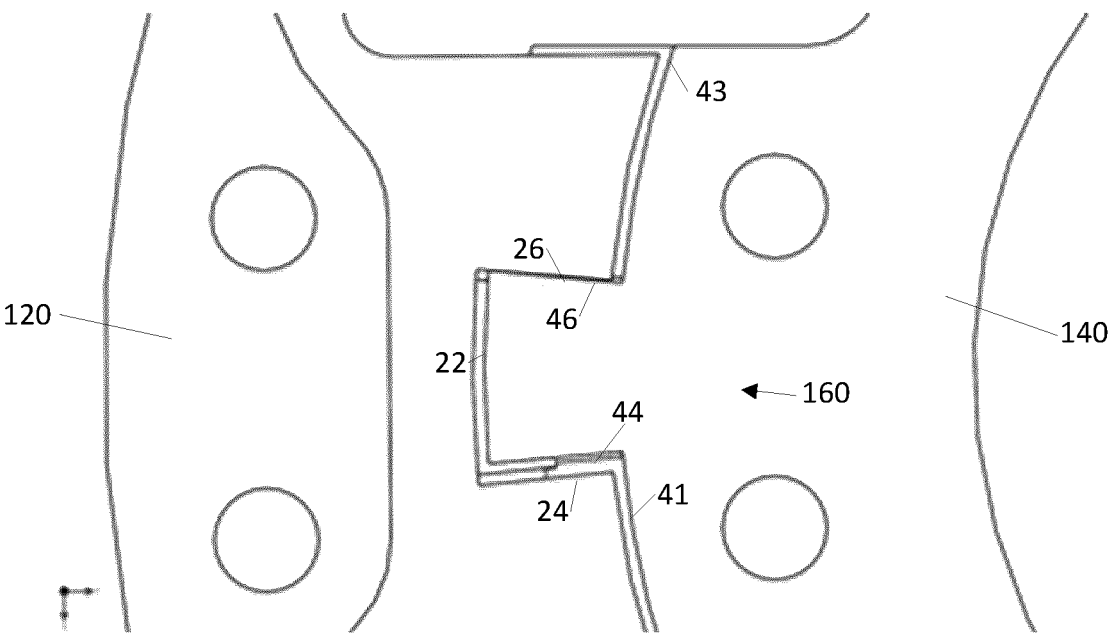
FIG. 13 is a top plan view of an overload structure of the force/torque sensor of FIG. 3, with the overload structure inhibiting further negative rotation about a Z axis.

In the example illustrated in FIG. 13, facets 25 and 45 and/or facets 26 and 46 are in abutment with each other, preventing further relative rotation of inner body structure 140 and the outer body structure 120 in a negative direction about an Z axis (i.e. in response to an external torque).

Figure 14:
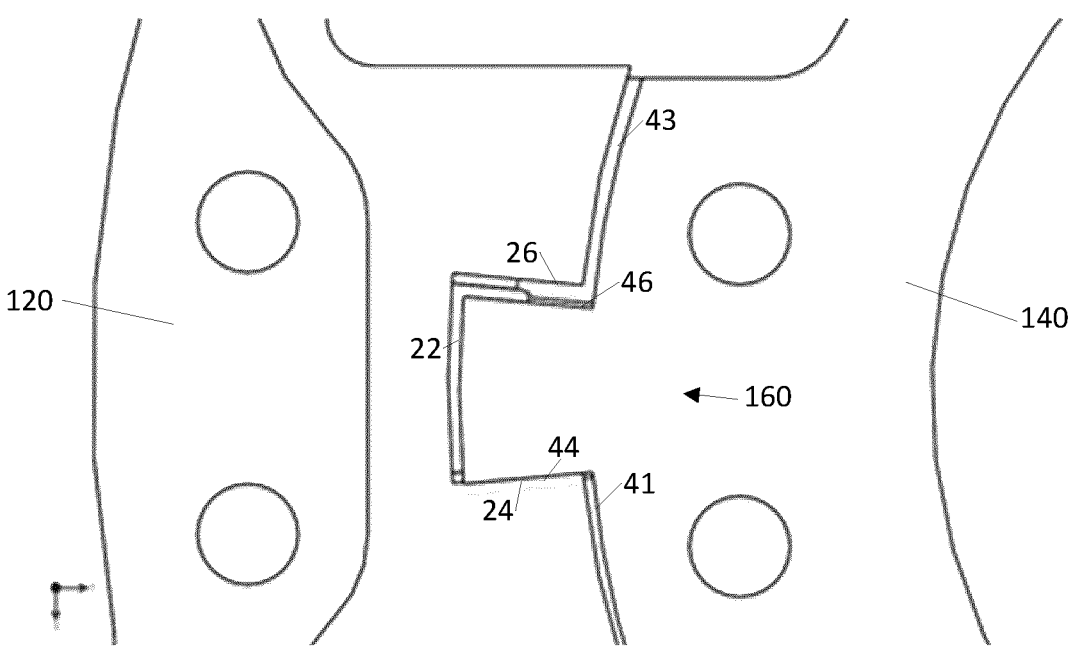
FIG. 14 is a top plan view of an overload structure of the force/torque sensor of FIG. 3, with the overload structure inhibiting further motion in the positive X direction.

In the example illustrated in FIG. 14, facets 24 and 44 and/or facets 27 and 47 are in abutment with each other, preventing further relative displacement of inner body structure 140 and the outer body structure 120 in response to an external force in the positive X direction.

Figure 15:
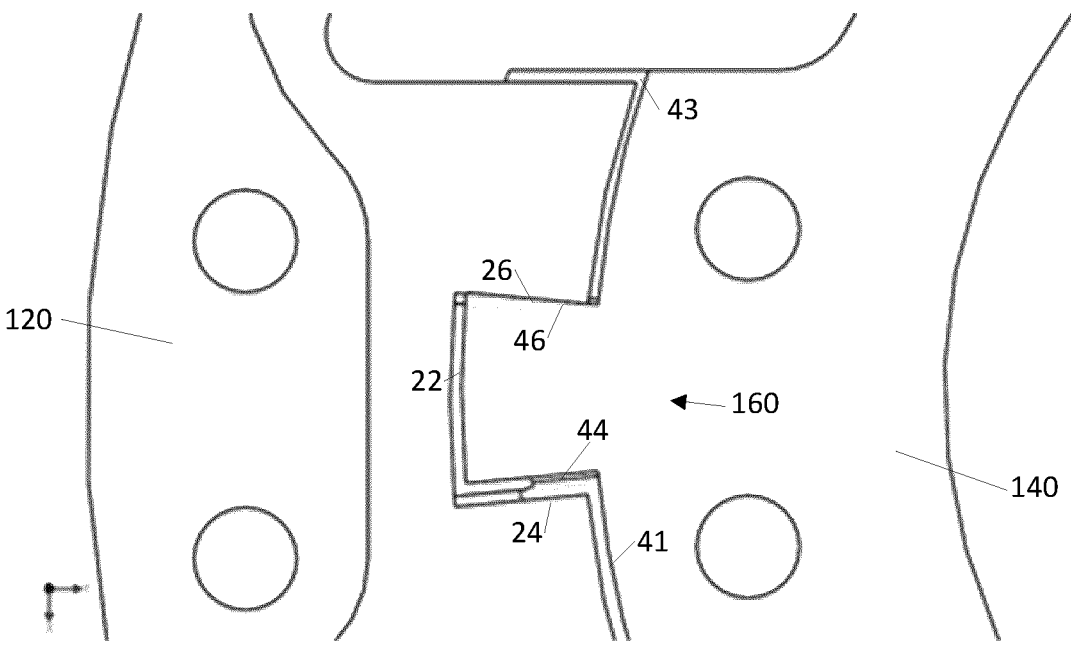
FIG. 15 is a top plan view of an overload structure of the force/torque sensor of FIG. 3, with the overload structure inhibiting further motion in the negative X direction.

In the example illustrated in FIG. 15, facets 25 and 45 and/or facets 26 and 46 are in abutment with each other, preventing further relative displacement of inner body structure 140 and the outer body structure 120 in response to an external force in the negative X direction.

Figure 16:
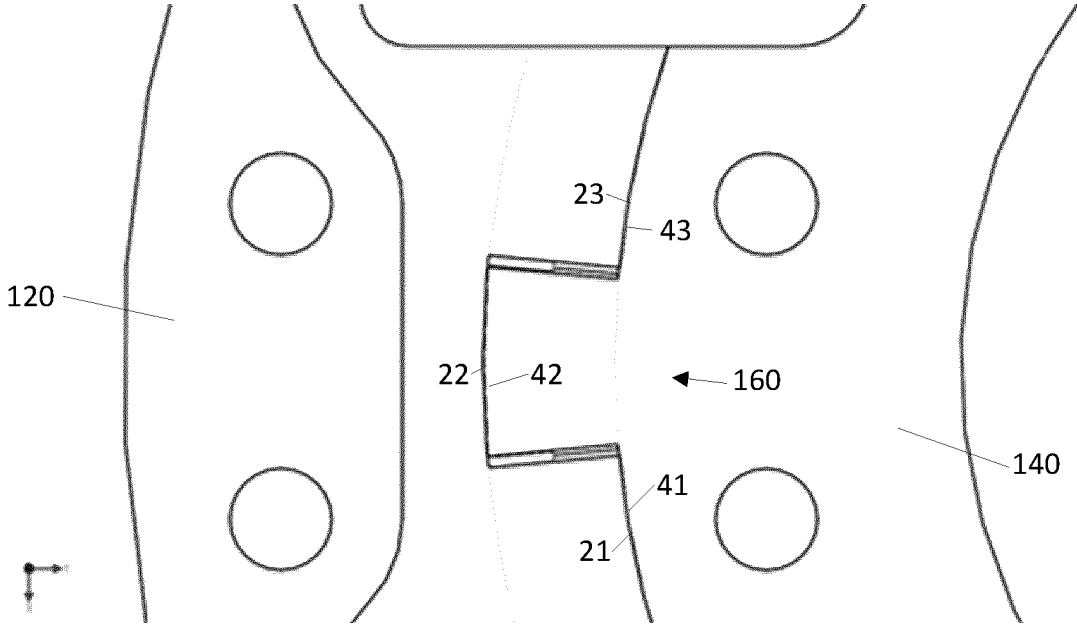
FIG. 16 is a top plan view of an overload structure of the force/torque sensor of FIG. 3, with the overload structure inhibiting further motion in the negative Y direction.

In the example illustrated in FIG. 16, facets 21 and 41 and/or facets 22 and 42 and/or facets 23 and 43 are in abutment with each other, preventing further relative displacement of inner body structure 140 and the outer body structure 120 in response to an external force in the negative Y direction. Excess displacement in the positive Y direction is provided by the other two overload structures 160 that are located ~±120° apart from the illustrated overload structures 160.

Sensor 100 may be formed using any suitable manufacturing method(s). For example, the outer body structure 120 an inner body structure 140 may be formed from a single blank of metal, and slots 180 may be machined from the blank, thereby forming sensor structures 130.

Overload structures 160 may be formed using any suitable method. For example, facets 21-27 and 41-47 may be cut using a waterjet guided laser technology, such as available from Avonisys AG of Zug, Switzerland, or from SYNOVA S.A. of Nyon, Switzerland. Waterjet guided laser technology may be particularly suitable to provide very a very thin gap distance between the inner and outer facets of an overload structure.

Preferably, overload structures may be formed using wire-cut electrical discharge machining (also known as wire-cut EDM or WEDM). For example, a body structure comprising an outer body structure 120, inner body structure 140, and sensor structures 130 may also include an overload bridge extending between the outer body structure 120 and the inner body structure 140. Such an overload bridge may be separated into an inner portion 164 and an outer portion 162 of an overload structure 160 using wire-cut EDM.

Using wire-cut EDM to provide the inner and outer facets of overload structure 160 may have one or more advantages. For example, a gap distance between opposing inner and outer facets may be determined by the diameter of the EDM wire. As a result, a sensor 100 with a larger gap distance (permitting a greater deflection of sensor structured 130 prior to abutment of opposing facets) may be produced using an EDM wire that has a larger kerf width, and a sensor 100 with a smaller gap distance may be formed from the same body structure using an EDM wire that has a smaller kerf width. This may facilitate 'tuning' sensor 100 through a choice of EDM wire diameter.

As another example, the illustrated design of the overload structure (including facets 21-27 and 41-47 may be 'cut' using a wire-cut EDM process in which the wire follows a single path, with no backtracking. For example, with reference to FIG. 3, an EDM wire may be threaded through slot 180d, moved generally laterally to form facets 21 and 41 of overload structure 160b, pivoted to form facets 24, 25, 44, and 45, moved generally laterally to form facets 22 and 42, pivoted to form facets 26, 27, 46, and 47, and moved generally laterally to form facets 23 and 43.

Providing an overload structure in which all of the facets may be cut using a single wire-cut EDM pass may have one or more advantages. For example, this may promote a consistent gap distance between the inner and outer portions 162, 164 of overload structure 160. In this respect, a 'single-pass' design may be expected to have improved dimensional tolerances, as multiple passes may introduce hysteresis errors during the machining operation. Also, using a single-pass operation may result in faster machining of the overload structure, e.g. re-threading of the wire may not be necessary. Also, a 'single-pass' design may facilitate 'tuning' sensor 100 by changing the EDM wire diameter, as discussed above.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A force/torque sensor comprising:
an outer body structure;
an inner body structure;
three sensor structures, each sensor structure extending between the outer body structure and the inner body structure; and
three overload structures, each overload structure being positioned between two of the three sensor structures;
wherein each of the three overload structures includes an outer portion extending inwardly from the outer body structure, and an inner portion extending outwardly from the inner body structure, and
wherein the outer portion of each overload structure has a plurality of outer facets including a first outer facet and a second outer facet, the inner portion has a plurality of corresponding opposing inner facets including a first inner facet and a second inner facet, the first inner facet corresponding to and opposing the first outer facet and the second inner facet corresponding to and opposite the second outer facet, and the plurality of outer facets and the plurality of inner facets are configured to permit a limited predetermined amount of relative motion between the inner body structure and the outer body structure in at least six degrees of freedom from a neutral position, and to inhibit relative motion between the inner body structure and the outer body structure beyond the predetermined amount, the first inner facet and the first outer facet limiting displacement of the inner body structure and the outer body structure in response to an external force in a positive direction along a Z axis of the force/torque sensor, the second inner facet and the second outer facet limiting displacement of the inner body structure and the outer body structure in response to an external force in a negative direction along the Z axis.

2. The force/torque sensor claim 1, wherein the three sensor structures and the three overload structures are spaced generally equidistantly from each other.

3. The force/torque sensor of claim 1, wherein, when the outer body structure and the inner body structure are in the neutral position, a gap between each of the plurality of outer facets and the corresponding one of the plurality of inner facets has a distance of between about 25 microns to 0.5 mm.

4. The force/torque sensor of claim 1, wherein each of the three sensor structures has a width of between about 1 to 25 mm.

5. The force/torque sensor of claim 4, wherein each of the three sensor structures has a width of between about 2 to 12 mm.

6. The force/torque sensor of claim 1, further comprising a strain sensor secured to each of the three sensor structures.

7. The force/torque sensor of claim 6, wherein the strain sensor comprises a metal-foil strain gauge.

8. The force/torque sensor of claim 1, wherein each of the sensor structures extends between the inner body structure and the outer body structure along a plane defined by an X axis of the force/torque sensor perpendicular to the Z axis and a Y axis of the force/torque sensor perpendicular to the X axis and the Z axis.

9. The force/torque sensor of claim 1, wherein the first inner facet, the second inner facet, the first outer facet and the second outer facet each includes a face angled relative to the Z axis.

10. The force/torque sensor of claim 9, wherein the face of each of the first inner facet and the second outer facet is directed in the negative direction along the Z axis, and the face of each of the first outer facet and the second inner facet is directed in the positive direction along the Z axis.

11. The force/torque sensor of claim 1, wherein the outer body structure and the inner body structure are formed from a single blank of metal.

12. A method of manufacturing a force/torque sensor frame comprising an outer body structure, an inner body structure, at least one sensor structure extending between the outer body structure and the inner body structure, and at least one overload structure, the method comprising:

providing a body structure comprising the outer body structure, the inner body structure, the at least one sensor structure extending between the outer body structure and the inner body structure, and at least one overload bridge extending between the outer body structure and the inner body structure; and separating, via wire-cut electrical discharge machining, each of the at least one overload bridge into an outer portion extending from the outer body structure and an inner portion extending from the inner body structure, the outer portion having a plurality of outer facets including a first outer facet and a second outer facet, and the inner portion having a plurality of corresponding opposing inner facets including a first inner facet and a second inner facet, the first inner facet corresponding to and opposing the first outer facet and the second inner facet corresponding to and opposite the second outer facet, and wherein the first inner facet and the first outer facet limit displacement of the inner body structure and the outer body structure in response to an external force in a positive direction along a Z axis of the force/torque sensor, the second inner facet and the second outer facet limit displacement of the inner body structure and the outer body structure in response to an external force in a negative direction along the Z axis.

13. The method of claim 12, wherein the wire-cut electrical discharge machining is performed in a single pass.

14. The method of claim 12, wherein the plurality of outer facets are formed during a first pass of the wire-cut electrical discharge machining, and the plurality of inner facets are formed during a second pass of the wire-cut electrical discharge machining.

15. The method of claim 12, wherein when the outer body structure and the inner body structure are in a neutral position, a gap between each of the plurality of outer facets and the corresponding one of the plurality of inner facets has a distance of between about 25 microns to 0.5 mm.

16. The method of claim 12, wherein the three sensor structures and the three overload structures are spaced generally equidistantly from each other.

17. The method of claim 12, wherein each of the sensor structures extends between the inner body structure and the outer body structure along a plane defined by an X axis of the force/torque sensor perpendicular to the Z axis and a Y axis of the force/torque sensor perpendicular to the X axis and the Z axis.

18. The method of claim 12, wherein the first inner facet, the second inner facet, the first outer facet and the second outer facet each includes a face angled relative to the Z axis.

19. The method of claim 18, wherein the face of each of the first inner facet and the second outer facet is directed in the negative direction along the Z axis, and the face of each of the first outer facet and the second inner facet is directed in the positive direction along the Z axis.

20. The method of claim 12, wherein the outer body structure and the inner body structure are formed from a single blank of metal.

* * * * *